March 7, 1944.  C. C. SCHEELE  2,343,584
RUBBER VALVE
Filed Dec. 12, 1941  2 Sheets-Sheet 1
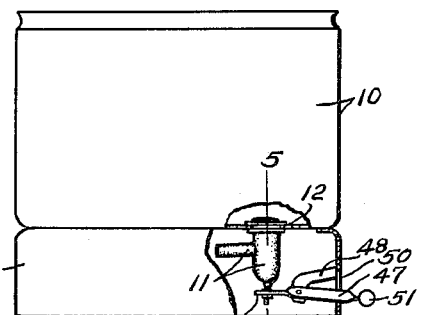
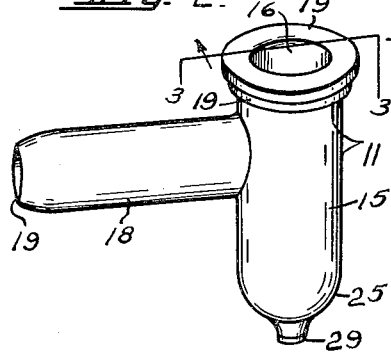
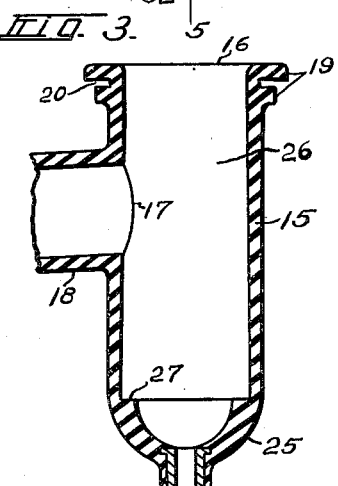
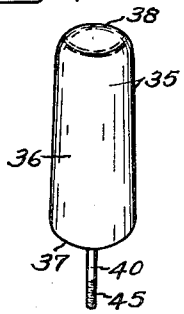
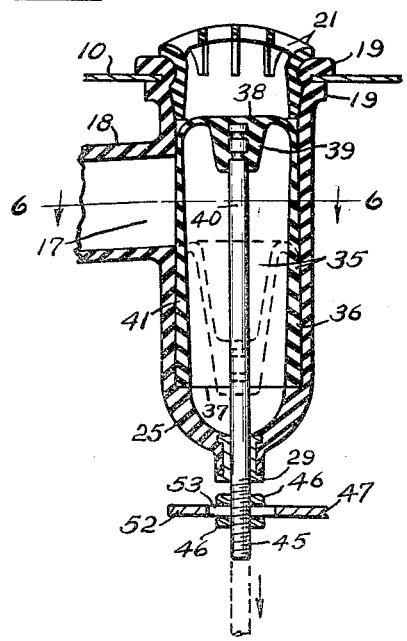
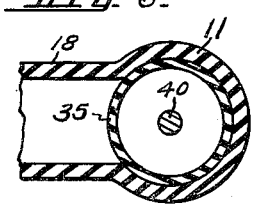
INVENTOR
CHARLES C. SCHEELE
BY Theodore E. Simonton
ATTORNEY March 7, 1944.                C. C. SCHEELE                2,343,584
                              RUBBER VALVE
                         Filed Dec. 12, 1941            2 Sheets-Sheet 2
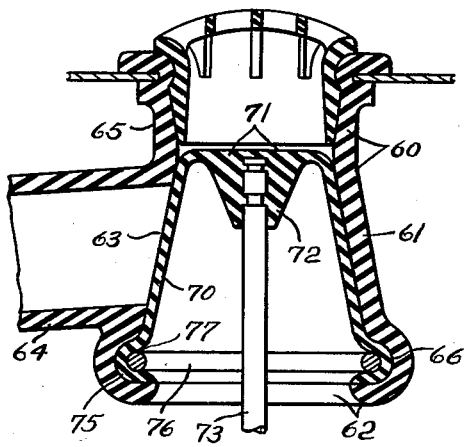
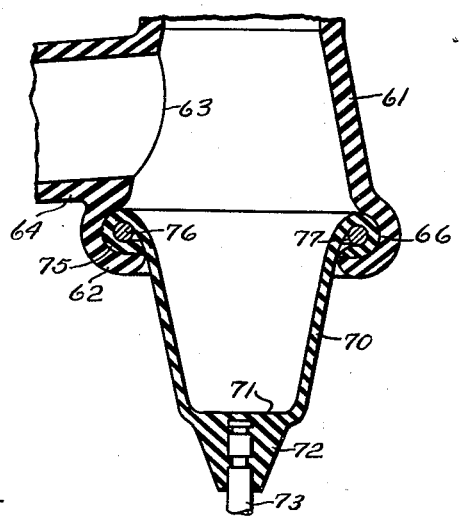
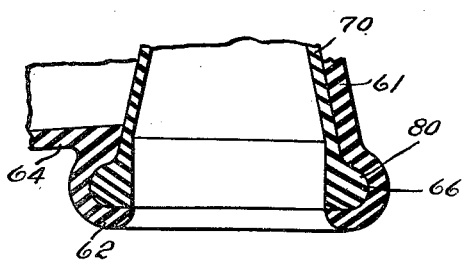
INVENTOR
CHARLES C. SCHEELE
BY Theodore E. Simonton
ATTORNEY Patented Mar. 7, 1944

2,343,584

UNITED STATES PATENT OFFICE 2,343,584

RUBBER VALVE

Charles C. Scheele, Syracuse, N. Y., assignor to Easy Washing Machine Corporation, Syracuse, N. Y., a corporation of Delaware Application December 12, 1941, Serial No. 422,733

3 Claims. (Cl. 251—24)

My invention is concerned with improvements in valves and is specifically directed to valves for use under low pressure heads.

I prefer to make the entire valve of my invention of rubber. It is apparent, however, that the valve body could be made of other suitable material. To my knowledge, there is no established category of valves in which the valve of my invention may be classed. It more nearly approaches that type of valve which is known as a piston valve than any other classification. My invention comprehends a valve having a collapsible piston or plug which, in its normal expanded shape, obstructs the flow of fluid through the valve, the plug, however, is so constructed and arranged that it may be collapsed and moved out of the path of flow whereby the fluid may pass freely through the valve.

In the drawings:

Figure 1 is a side elevation of a washing machine tub, parts being broken away, showing the valve of my invention mounted in the bottom of the tub to control the drainage of water therefrom.

Figure 2 is a perspective view of one form of the valve of my invention.

Figure 3 is a section, part being broken away, taken on the line 3—3 of Figure 2, showing the construction of the valve body.

Figure 4 is a perspective view of my collapsible piston or plug.

Figure 5 is a section, parts being broken away, taken on the line 5—5 of Figure 1, the dotted lines showing the piston in the collapsed position.

Figure 6 is a section, part being broken away, taken on the line 6—6 of Figure 5.

Figure 7 is a vertical section, parts being broken away, showing a modified form of the valve of my invention.

Figure 8 is a section, parts being broken away, similar to Figure 7, but showing the collapsible piston pulled inside out.

Figure 9 is a vertical section, parts being broken away, showing a modified form of construction of the lower portion of the piston shown in Figures 7 and 8.

Referring now to the drawings:

In Figure 1, 10 represents a sheet metal tub as employed in a washing machine. The valve 11, in this instance, is mounted in an opening 12 in the bottom of the tube 10. The valve 11 comprises the valve body 15 which, in this instance, is a vertical tubular member having an entrance 16 at the upper end and a port 17 in the side thereof. In the valve illustrated, a substantially horizontally extending portion 18 is provided which may be connected at its free end 19 to a pipe or tube. The body 15 is provided at its upper end with a pair of outwardly extending flanges 19 defining a groove 20 between them. A member 21 is provided for expanding the portion 15 adjacent the flanges 19 to secure the valve in the tub bottom. This structure is more fully described in my co-pending application, Serial No. 420,710, filed November 27, 1941, now Patent No. 2,314,315, granted March 16, 1943, and does not form a part of my present invention. In the preferred form, the lower end 25 of the body 15 is provided with a hemispheric closure formed integrally with the body 15. The wall of the portion 25 is considerably thicker than the wall of the body 15, as clearly shown in Figure 3. The bore 26 of the portion 15 ends in a circular seat 27 adjacent the portion 25. An opening 28 is provided in the bottom of the portion 25 for a purpose presently to be described. In the preferred form, wherein the valve body is made of molded rubber, I prefer to mold a brass plated steel insert 29 in the portion 25 to provide the opening 28.

A collapsible piston 35 is provided for blocking and uncovering the port 17. The piston 35 is molded of rubber, and comprises a cylinder 36 open at the lower end 37 and closed at the upper end by a head 38. The piston 35 is preferably made slightly larger than the bore 26 of the valve body to give a tight seal. An internally extending boss 39 is molded integrally with the piston head 38, and means provided for securing a valve rod 40 to the boss 39. In the preferred form, the rod 40 is secured in the boss 39 when the collapsible piston is molded. I have found it advantageous to make the wall 41 of the collapsible piston 35 thinner and more flexible near the head 38 than it is near the open end 37. This thinning or tapering of the wall permits collapsing the piston 35 more easily. When the head 38 of the collapsible piston 35 is forced downwardly, it passes down inside the piston wall 41, rolling the piston inside out. This action tends to force the piston walls out against the valve body and increase the seal between the piston and the valve body. Thus when fluid pressure is exerted on the head of the piston the valve tends to become tighter. Furthermore, as the piston tends to turn inside out, the fluid pressure tends to push the piston wall 41 out against the valve body 15.

The rod 40 extends downwardly through the opening 28 and has a threaded portion 45 adjacent the lower end thereof. A pair of nuts 46 may be threaded on the threaded portion 45 of the rod 40 in order that an operating member may be connected to the rod 40. The particular form of the operating member is not important, but as shown in Figure 1, it may be a simple lever 47 pivoted to a bracket 48 secured to the skirt 49 of the tub 10. The lever 47 projects outwardly through a slot 50 in the skirt 49 and has an operating knob 51 affixed to the end thereof. The opposite end 52 of the lever 47 is provided with the slot 53 through which the rod 40 extends. The nuts 46 are positioned on either side of the lever 47 so that when the operating knob of the lever 47 is lifted upwardly the rod 40 is moved downwardly to collapse the piston, as shown in the dotted lines in Figure 5. In the collapsed position, there is an unobstructed passage through the valve from the entrance 16 out through the port 17. When the operating knob 51 is pushed downwardly, the collapsible piston 35 is expanded to its normal position as shown in Figure 5, whereupon the outlet port 17 is blocked.

The lower portion of the collapsible piston 35 is cemented or otherwise sealed to the valve body 15. By this construction there is no possibility of leakage downwardly past the piston 35. The rod 40 and the opening 28 are permanently sealed from any contact with the liquid which may be passing through the valve, and thus no gland or packing is required around the rod 40.

The valve of my invention can also be used as a check valve by reversing the normal flow of fluid through the valve. For example if fluid is passed into the valve through the connection 19, the fluid pressure will deform the piston 35 and pass around it to exit from the upper end 16 of the valve. If however, the pressure at the upper end of the body 15 becomes greater than the pressure at 19, the plug 35 acts normally to block the port 17.

I have shown a modified form of my rubber valve in Figures 7, 8 and 9. In the modified construction, the valve body 60 is provided with a truncated conical portion 61. The bottom 62 of the valve body is left open. A port 63 is provided in the side of the portion 61. The tubular outlet 64 is molded integrally with the valve body 60. The upper portion 65 of the valve body is similar to the upper portion of the valve body disclosed in Figures 2, 3 and 5. Adjacent the lower end 62 of the valve body is provided an internal groove 66 for a purpose presently to be described.

In the modified form, the collapsible piston 70 is a truncated cone proportioned to fit snugly within the portion 61 of the valve body. The head 71 of the collapsible piston 70 is provided with an internally projecting boss 72. In the preferred form, the valve rod 73 is molded in place in the boss 72, although, of course, other suitable fastening means could be employed for connecting the valve rod to the piston head. In the modification shown in Figures 7 and 8, the lower portion of the collapsible piston 70 is provided with a flange 75 which is adapted to fit into the groove 66. The piston may be assembled and held in place in the valve body by means of the snap ring 76 which is adapted to be forced into an internal groove 77 located adjacent the lower end of the piston 70. In the modification shown in Figure 9, the lower end of the piston 70 is provided with a solid outwardly extending flange 80 which is adapted to fit into the groove 66 of the valve body. It is understood that in either modification the flange 75, as shown in Figure 7, or the flange 80, as shown in Figure 9, may be cemented into the groove 66 or otherwise suitably sealed to the valve body. In Figure 8, the collapsible piston 70 is shown pulled inside out completely uncovering the port 63.

Although I have shown two specific modifications of my invention, it is apparent that the particular form and dimensions of the parts may be varied without departing from the spirit of my invention which embraces the scheme of employing a collapsible piston to block or unblock the passage through a valve body.

I claim:

1. A valve comprising a body having a tubular chamber, inlet and outlet ports opening into said chamber, at least one of said ports being located in the side wall thereof, a collapsible hollow plug of elastic material so constructed and arranged that the plug may be collapsed and the side wall thereof turned at least partially inside out by drawing one end of the plug within the hollow portion of the plug, said plug being fitted into said chamber so that in its normal position said plug side wall blocks said side port and in its collapsed position said side port is freed, and means comprising a push-pull connection to said one end of the plug for collapsing the plug and for restoring the plug to normal position.

2. A valve comprising a body having a chamber of circular cross-section, a port adjacent one end of said chamber, a port in the side wall of said chamber, a collapsible hollow plug of elastic material so constructed and arranged that the plug may be collapsed and the side wall thereof turned at least partially inside out by drawing one end of the plug within the hollow portion of the plug, said one end of the plug being closed and extending toward the end port of said chamber and the other end of the plug being sealed to the chamber wall adjacent the opposite end thereof, said plug being fitted into said chamber so that in its normal position said plug side wall blocks said side port and in its collapsed position said side port is freed, and means comprising a push-pull connection to said closed end of the plug for collapsing the plug and for restoring the plug to normal position.

3. A valve comprising a body having a chamber of circular cross-section, a port adjacent one end of said chamber, an annular seat adjacent the other end of said chamber, a port in the side wall of said chamber, a collapsible hollow plug of elastic material so constructed and arranged that the plug may be collapsed and the side wall thereof turned at least partially inside out by drawing one end of the plug within the hollow portion of the plug, said one end of the plug being closed and extending toward the end port of said chamber and the other end of the plug being open and positioned on said seat and sealed thereto, said plug being fitted into said chamber so that in its normal position said plug side wall blocks said side port and in its collapsed position said side port is freed, and means comprising a push-pull connection to said closed end of the plug for collapsing the plug and for restoring the plug to normal position.

CHARLES C. SCHEELE.